(12) United States Patent
Ono et al.

(10) Patent No.: US 8,993,192 B2
(45) Date of Patent: Mar. 31, 2015

(54) ELECTROLYTE MEMBRANE AND MEMBRANE-ELECTRODE ASSEMBLY

(75) Inventors: Tomohiro Ono, Ibaraki (JP); Takeshi Nakano, Ibaraki (JP); Taketomo Yamashita, Ibaraki (JP); Keiji Kubo, Ibaraki (JP); Nozomu Sugoh, Ibaraki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 263 days.

(21) Appl. No.: 13/201,539

(22) PCT Filed: Feb. 12, 2010

(86) PCT No.: PCT/JP2010/052035
§ 371 (c)(1),
(2), (4) Date: Aug. 15, 2011

(87) PCT Pub. No.: WO2010/095562
PCT Pub. Date: Aug. 26, 2010

(65) Prior Publication Data
US 2011/0300469 A1    Dec. 8, 2011

(30) Foreign Application Priority Data

Feb. 17, 2009 (JP) ................................. 2009-034140

(51) Int. Cl.
*H01M 8/10* (2006.01)
*C08J 5/22* (2006.01)
*H01B 1/12* (2006.01)

(52) U.S. Cl.
CPC ............... *C08J 5/2206* (2013.01); *H01B 1/122* (2013.01); *H01M 8/1023* (2013.01); *H01M 8/1044* (2013.01); *H01M 8/1053* (2013.01); *H01M 8/1081* (2013.01); *Y02E 60/521* (2013.01); *C08J 2327/18* (2013.01)

USPC .......................................... 429/483; 429/492

(58) Field of Classification Search
None
See application file for complete search history.

(56) References Cited

U.S. PATENT DOCUMENTS

| 2006/0141314 A1 | 6/2006 | Kim et al. |
| 2008/0254338 A1* | 10/2008 | Uehara et al. ................... 429/33 |
| 2009/0123804 A1* | 5/2009 | Yamashita et al. .............. 429/33 |

FOREIGN PATENT DOCUMENTS

| JP | 2003 142125 | 5/2003 |
| JP | 2006 156397 | 6/2006 |

(Continued)

OTHER PUBLICATIONS

Ichino, New concept for polymer electrolyte: dual phase polymer electrolyte, 1995, Electrochimica Acta, 40, 2263-2268.*

(Continued)

*Primary Examiner* — Ula C. Ruddock
*Assistant Examiner* — Daniel Gatewood
(74) *Attorney, Agent, or Firm* — Oblon, McClelland, Maier & Neustadt, L.L.P.

(57) ABSTRACT

An electrolyte membrane having a structure wherein fine rubber particles having substantially no ion-conducting group and having an average particle size of 20 nm to 1 μm are uniformly dispersed in a matrix including a resin component having ion-conducting group. The electrolyte membrane has high bonding ability to electrodes and does not cause cracks and ruptures because it is kept flexible even under low humid or absolutely dried condition, in addition, shows high ion conductivity even under low humid or absolutely dried condition because the matrix having ion-conducting groups are continuous.

14 Claims, 2 Drawing Sheets

(56) References Cited

FOREIGN PATENT DOCUMENTS

JP   2006 210326   8/2006
JP   2008 248116   10/2008

OTHER PUBLICATIONS

Chinese Office Action issued Jul. 4, 2012, in China Patent Application No. 201080008008.2.

Toshihiro Ichino, et al., "New Concept for Polymer Electrolyte: Dual-Phase Polymer Electrolyte", Electrochimica Acta, vol. 40, No. 13-14, Oct. 31, 1995, pp. 2265-2268.

International Search Report Issued Apr. 27, 2010 in PCT/JP10/052035 filed Feb. 12, 2010.

\* cited by examiner

ELECTROLYTE MEMBRANE AND MEMBRANE-ELECTRODE ASSEMBLY

TECHNICAL FIELD

The present invention relates to electrolyte membranes and membrane-electrode assemblies composed of the electrolyte membrane and electrodes on both surfaces thereof, which find wide application in electrolyte membranes of cells, capacitors, actuators, sensors, ion exchange membranes, and coating materials.

BACKGROUND ART

In various application fields, the demand for high performance polyelectrolyte membrane is growing. Particularly, in the filed of fuel cell, since the application thereof to portable, home and automotive uses, such as mobile PC, PDA, and cellular phone, is expected, the development of high performance membrane is urgently required. At first, a fluorine-containing electrolyte membrane has been mainly used. The fluorine-containing electrolyte membrane is excellent in ion conductivity and certain durability, but involves drawbacks, e.g., generation of fluorine compounds due to the decomposition during its use, high fuel permeation, and high costs. Therefore, the substitute for fluorine-containing electrolyte membrane has been demanded.

Recently, hydrocarbon materials have been proposed as a substitute for fluorine-containing electrolyte. Specifically, a material produced by introducing ion-conducting groups such as sulfonic acid group to a base polymer having a nature resembling engineering plastic, for example, polyether sulphone (PES) and polyether ether ketone (PEEK) has been proposed.

For example, Patent Document 1 proposes a sulphonated PES. Since such material is free from fluorine, the fluorine compound cannot be generated even when the material is degraded. Such material would be costly advantageous if the technical problems in its production, for example, the introduction of ion-conducting groups and the film formation, are solved.

However, since the engineering plastics are basically random polymers, the introduced ion-conducting groups are distributed relatively uniformly. High ion exchange capacity is required for obtaining high ion conductivity. However, the swelling tends to easily occur as the ion exchange capacity is increased. If a material having high ion exchange capacity is used as the electrolyte membrane of a fuel cell, the membrane is subjected to swelling-contracting cycles repeatedly during repeated start-stop cycles (repeated humidifying-drying cycles) and causes cracks because the base polymer is hard and brittle, thereby likely to cause the leakage of fuel. Since the base polymer is particularly hard and brittle in absolutely dried condition, a membrane having ion conductivity sufficient for practical use has not yet been obtained.

To prevent the swelling and enhance the water resistance, a sulphonated product of modified PES comprising blocks having ion-conducting groups introduced and blocks not introduced has been proposed. However, the proposed material is produced basically by polycondensation and therefore the blocks are randomly mixed, failing to obtain a sufficient phase separation (Patent Document 2).

The electrolyte membrane described in Patent Document 3 has good bonding ability with electrodes because it is made of a block copolymer having flexible blocks. In addition, since the block copolymer is not a polycondensed material, the block structure is maintained after the polymerization. Therefore, the ion channel and the rubbery portion are kept completely apart from each other by the phase separation structure peculiar to block copolymers, to provide a membrane capable of preventing cracks due to repeated humidifying-drying cycles.

PRIOR ART DOCUMENTS

Patent Documents

PATENT DOCUMENT 1: JP 10-045913A
PATENT DOCUMENT 2: JP 13-250567A
PATENT DOCUMENT 3: JP 2006-210326A
PATENT DOCUMENT 4: WO 2002/040611

SUMMARY OF THE INVENTION

Problems to be Solved by the Invention

The electrolyte membrane made of a block copolymer is flexible, but its performance is insufficient in low humidity or non-humidified conditions and limited even when increasing the ion exchange capacity. Therefore, sufficient ion conductivity in low humidity or non-humidified conditions has not been obtained.

Means for Solving the Problems

As a result of extensive research to solve the above problems, the inventors have accomplished the present invention.

Namely, the present invention provides an electrolyte membrane having a structure wherein fine rubber particles having an average particle size of 20 nm to 1 μm and having substantially no ion-conducting group are uniformly dispersed in a matrix comprising a resin component having ion-conducting groups.

The present invention further provides a multi-layered electrolyte membrane having a multi-layered structure which comprises at least one layer of the electrolyte membrane, wherein the electrolyte membrane is disposed on a surface or an inside of the multi-layered structure.

The present invention further provides a membrane-electrode assembly (MEA) comprising the electrolyte membrane or the multi-layered electrolyte membrane and electrodes on both surfaces thereof.

The present invention further provides a method of producing an electrolyte membrane, which comprises:
(1) a step of preparing a dispersion of fine core-shell particles each of which comprises a fine rubber particle covered with a resin component, wherein the fine rubber particle has substantially no ion-conducting group and the resin component has ion-conducting groups, and
(2) a step of solidifying the dispersion by drying to obtain a structure wherein fine particles having an average particle size of 20 nm to 1 μm are uniformly dispersed in a matrix comprising a resin component having ion-conducting groups.

Effect of the Invention

In the electrolyte membrane of the invention, the resin component having ion-conducting groups forms the matrix and the fine rubber particles are dispersed separately and uniformly in the matrix. Therefore, the rubber component of fine rubber particles enhances the ductility of membrane and the ion-conducting path is not discontinued because of the continuous ion-conducting matrix. In addition, high ion conductivity is assured even in low humidity or non-humidified conditions because of the densified ion-conducting groups in the matrix (ion-conducting path).

The membrane-electrode assembly of the invention is excellent in the adhesion between the membrane and the electrodes. Using a unit cell comprising such a membrane-electrode assembly having a separator disposed outside thereof, a fuel cell with high performance of electric generation is provided. Therefore, the present invention is industrially extremely useful.

MODE FOR CARRYING OUT THE INVENTION

Figure 1:
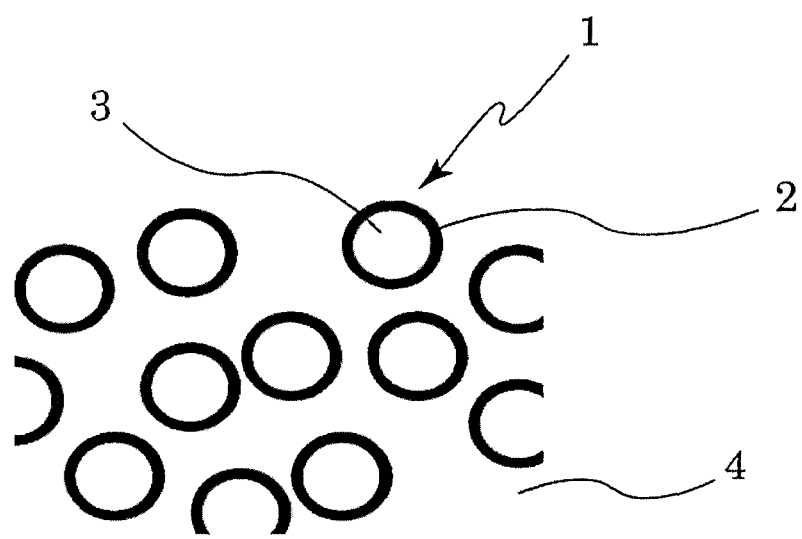
FIG. 1 is a schematic illustration showing a dispersion for producing the electrolyte membrane of the invention.

Preferred embodiments of the invention will be described below.

In the electrolyte membrane of the invention, preferably 50% by weight or more, more preferably 70% by weight or more, and still more preferably 90% by weight or more (each inclusive of 100%) of the matrix is occupied by the resin component having ion-conducting groups. The resin component having ion-conducting groups is preferably a non-rubbery resin component having a glass transition temperature or softening point of 10° C. or higher, preferably 30° C. or higher in view of enhancing the strength of the electrolyte membrane.

The number average molecular weight of the resin component having ion-conducting groups is preferably 4000 to 70000 and more preferably 6000 to 50000. If smaller than the above range, the matrix may be eluted away. If larger than the above range, the production thereof may be difficult.

In view of preventing the elution of the resin component having ion-conducting groups, the content of the resin having a molecular weight of 1000 or less, preferably 2000 or less is preferably 10% by weight or less and more preferably 5% by weight or less. Therefore, in addition to the number average molecular weight within the above range, the resin component preferably has a narrow molecular weight distribution. The resin having a narrow molecular weight distribution is produced, for example, by a living polymerization or a method in which a low molecular weight component is removed by Soxhlet extraction from the obtained resin, although not limited thereto. The living polymerization is preferred in view of facilitating the production process, and the low molecular weight component is removed preferably by Soxhlet extraction in view of easiness of controlling the polymerization process.

The resin component having ion-conducting groups does not need to have the ion-conducting group in every repeating unit therein and generally includes a repeating unit having no ion-conducting group. The resin component having ion-conducting groups is produced by the polymerization of a monomer having an ion-conducting group and an optional monomer having no ion-conducting group or a method in which a monomer having no ion-conducting group is polymerized and then the ion-conducting group is introduced into the obtained polymer by a known method of introducing the ion-conducting group.

In addition to the resin component having ion-conducting groups, the matrix of the electrolyte membrane of the invention may contain another component, for example, a resin component having no ion-conducting group, as long as the effect of the invention is not adversely affected. The resin component having no ion-conducting group is preferably, but not particularly limited to, a resin having a high affinity for the resin component having ion-conducting groups, because it is highly necessary to prevent the phase separation of the matrix. The resin component having no ion-conducting group has a number average molecular weight and a molecular weight distribution in the same ranges as those of the resin component having ion-conducting groups. It is preferred for the resin component having no ion-conducting group not to contain a low molecular weight component having a molecular weight of 2000 or lower, particularly 1000 or lower and particularly a low molecular weight component having polar functional group because it is easily eluted during use.

The amount of the ion-conducting group is important for the performance of the electrolyte membrane. To obtain sufficient ion conductivity required for the use as an electrolyte membrane, the content of the ion-conducting group in the electrolyte membrane is preferably 0.30 meq/g or more and more preferably 0.40 meq/g or more when expressed by the ion exchange capacity. The ion exchange capacity is preferably 3.00 meq/g or less, because the electrolyte membrane is highly hydrophilic and therefore easily swells if it is excessively large. In the electrolyte membrane of the invention, the ion-conducting group is selectively included in the matrix so as to combine the strength and the ion conductivity. Therefore, the content of the ion-conducting group in the matrix is also important and preferably 0.50 meq/g or more, more preferably 1.50 meq/g or more, and still more preferably 2.50 meq/g or more.

The ratio of the ion-conducting group to the repeating unit of the resin component having ion-conducting groups is preferably 10 mol % or more and more preferably 20 to 200 mol %. In view of combining the easiness of production and high performance, the ratio is still more preferably 30 to 150 mol % and particularly preferably 50 to 100 mol %. If the resin component having ion-conducting groups includes both the monomer unit having the ion-conducting group and the monomer unit having no ion-conducting group, the resin component is preferably a random copolymer of the monomer unit having the ion-conducting group and the monomer unit having no ion-conducting group because the phase separation of the resin component is prevented.

The electrolyte membrane of the invention has a structure in which fine rubber particles having substantially no ion-conducting group are uniformly dispersed in the matrix comprising the resin component having ion-conducting groups. The fine rubber particles may covalently bond to another polymer component and may covalently bond to the resin component in the matrix because it is highly desirable for the fine rubber particles to form a single phase. To obtain the fine rubber particles of a single phase, it is preferred for the fine rubber particle portion and the other polymer component to form separate polymer segments, for example, as in block polymer and graft polymer. The term "having substantially no ion-conducting group" used herein means that the content of the monomer units having ion-conducting group is less than 5 mol % based on the polymer constituting the fine rubber particles (the component constituting the fine rubber particles if it covalently bonds to another polymer).

The structure mentioned above is obtained by the blend of a resin for forming the matrix and a resin for forming the fine rubber particles; the aggregation of fine core-shell particles; the phase separation of copolymer, such as block copolymer and graft copolymer, comprising a resin component for forming the matrix and a rubber component; and the phase separation of a resin component having ion-conducting groups and a rubber component having substantially no ion-conducting group (these components may chemically bond to each other).

In the phase separation of resin blend of two components which are largely different in their polarity as in the invention, the size of separated phase is generally large and its shape is irregular in some cases. Micro phase separation can be caused by spinodal decomposition. However, the combination of polymers which are micro phase-separated by this method is limited because the combination showing the phase diagram of UCST or LCST is limited. Therefore, it is necessary to suitably select a combination which can form the phase separation structure in which the fine rubber particles are dispersed.

To cause the phase separation of block copolymer by a usual solution casting process or melt forming process, the composition and condition for forming the fine rubber particles are also largely limited, for example, the amount of ion-conducting groups and the ratio of blocks are limited. If the phase separation in the form of lamellae occurs, the ion-conducting phase is discontinued to increase the membrane resistance. Therefore, the material is limited when the structure of the invention is intended to obtain by a usual solution casting process or melt forming process.

The electrolyte membrane having the structure of the invention is most preferably produced by a method including a step of forming the fine rubber particles in advance by an emulsion polymerization or post-emulsification. However, when using a mere dispersion of the resin for forming the fine rubber particles, the fine rubber particles may aggregate together when blending with the resin having the ion-conducting groups and removing the solvent. In addition, when dispersing in a polar solvent, such as water, a surfactant is needed. The surfactant remains in the electrolyte membrane to adversely affect the cell performance in many cases.

Therefore, the electrolyte membrane having the structure of the invention is preferably produced by preparing a dispersion of core-shell particles comprising fine rubber particles having the ion-conducting group in their outer shell and making the dispersion into membrane. Using such a dispersion, the obtained electrolyte membrane has a three-dimensionally aggregated structure of core-shell particles comprising fine rubber particles having substantially no ion-conducting group and a resin component having ion-conducting groups covering the surface of the particles. In such structure, the dispersion is stabilized by the ion-conducting groups localized on the surface of core-shell particles, to make the use of surfactant unnecessary. In addition, since the particles are packed well densely when forming into membrane, the density of the ion-conducting group in the matrix is increased to enhance the ion conductivity. The dispersion of core-shell particles is prepared by a post-emulsification of block copolymer or a soap-free emulsion polymerization.

(1) Preparation of Dispersion by Post-Emulsification of Block Copolymer

The block copolymer at least has a block having ion-conducting group and a block for forming the fine rubber particles having substantially no ion-conducting group. Therefore, a block copolymer having di- or more blocks is usable. Examples of the block copolymer include A-B diblock copolymer, A-B-A triblock copolymer, A-B-C triblock copolymer, A-B-A-B tetrablock copolymer, A-B-A-C tetrablock copolymer, A-B-C-A tetrablock copolymer, A-B-C-B tetrablock copolymer, A-B-C-D tetrablock copolymer, A-B-A-B-A pentablock copolymer, A-B-A-B-C pentablock copolymer, A-B-A-C-A pentablock copolymer, A-B-A-C-B pentablock copolymer, A-B-A-C-D pentablock copolymer, A-B-C-A-B pentablock copolymer, A-B-C-A-C pentablock copolymer, A-B-C-A-D pentablock copolymer, A-B-C-B-A pentablock copolymer, A-B-C-B-C pentablock copolymer, A-B-C-B-D pentablock copolymer, A-B-C-D-A pentablock copolymer, A-B-C-D-B pentablock copolymer, A-B-C-D-C pentablock copolymer, and A-B-C-D-E pentablock copolymer, wherein A, B, C, D, and E are blocks distinct from each other and at least one of them is a block having ion-conducting groups and at least one of them is a block for forming fine rubber particles having substantially no ion-conducting group. Of the above, preferred are tri- or more block copolymers which do not have a block for forming fine rubber particles at their terminal ends in view of mechanical strength of the electrolyte membrane. These block copolymers may be used alone or in combination of two or more.

The main monomer for constituting the ion-conducting group-containing block is preferably a vinyl compound and particularly preferably an aromatic vinyl compound. The monomer to be polymerized does not need to have the ion-conducting group. In the invention, the ion-conducting groups are introduced by either of a method of polymerizing a monomer having no ion-conducting group and then introducing the ion-conducting groups or a method of polymerizing a monomer having ion-conducting group.

A method of introducing the ion-conducting group after polymerizing a monomer having no ion-conducting group will be described below.

Example of the aromatic vinyl compound include, but not particularly limited to, a compound which is polymerized to form a repeating unit represented by formula (I):

wherein Ar is an aryl group having 6 to 14 carbon atoms and optionally having 1 to 3 substituents, $R^1$ is a hydrogen atom, an alkyl group having 1 to 4 carbon atoms and optionally having 1 to 9 substituents, or an aryl group having 6 to 14 carbon atoms and optionally having 1 to 3 substituents.

Examples of the aryl group having 6 to 14 carbon atoms for Ar include phenyl group, naphthyl group, phenanthryl group, anthryl group, indenyl group, and biphenyl group. The optional 1 to 3 substituents of the aryl group are each independently an alkyl group having 1 to 4 carbon atoms (for example, methyl group, ethyl group, propyl group, isopropyl group, butyl group, isobutyl group, and tert-butyl group) and a haloalkyl group having 1 to 4 carbon atoms (for example, chloromethyl group, 2-chloroethyl group, and 3-chloropropyl group).

Examples of the alkyl group having 1 to 4 carbon atoms for $R^1$ include methyl group, ethyl group, propyl group, isopropyl group, butyl group, isobutyl group, and t-butyl group. The alkyl group may have one or more substituents of the same or different kinds. Examples there of include, but not particularly limited to, an aryl group, such as phenyl group, naphthyl group, phenanthryl group, anthryl group, indenyl group, and biphenyl group and a halogen, such as chlorine and bromine.

Examples of the aryl group having 6 to 14 carbon atoms for $R^1$ include phenyl group, naphthyl group, phenanthryl group, anthryl group, indenyl group, and biphenyl group. The optional 1 to 3 substituents of the aryl group are each independently an alkyl group having 1 to 4 carbon atoms, such as methyl group, ethyl group, propyl group, isopropyl group, butyl group, isobutyl group, and tert-butyl group, each optionally substituted by, but not particularly limited to, an aryl group, such as phenyl group, naphthyl group, phenanthryl group, anthryl group, indenyl group, and biphenyl group, or a halogen, such as chlorine and bromine. The optional substituent may be one or more and the same or different.

Two or more kinds of the aromatic vinyl compound may be combinedly used. The block to be converted to the ion-conducting group-containing block after the copolymerization of two ore more kinds of monomers may be formed by any of random copolymerization, block copolymerization, graft copolymerization, and tapered copolymerization.

In addition to the aromatic vinyl compound unit, the ion-conducting group-containing block may include one or more kinds of other monomer units as long as the effect of the invention is not adversely affected. Examples thereof include a conjugated diene having 4 to 8 carbon atoms (specific examples are selected from the examples of the monomer mentioned below which forms the fine rubber particles substantially free from the ion-conducting group), an alkene having 2 to 8 carbon atoms (specific examples are selected from the examples of the monomer mentioned below which forms the fine rubber particles substantially free from the ion-conducting group), a (meth)acrylic ester (for example, methyl(meth)acrylate, ethyl(meth)acrylate, and butyl(meth)acrylate), a vinyl ester (for example, vinyl acetate, vinyl propionate, vinyl butylate, and vinyl pivalate), and a vinyl ether (for example, methyl vinyl ether and isobutyl vinyl ether).

The ion referred to in the term "ion-conducting group" mainly means a charged particle of a low molecular weight, such as proton. The ion-conducting group is not particularly limited as long as it makes the electrolyte membrane of the invention which is sufficiently ion-conductive. Preferred examples thereof include a sulfonic acid group, a phosphonic acid group, a carboxyl group, and their salt forms which are represented by —$SO_3M$, —$PO_3HM$, or —COOM wherein M is hydrogen ion, ammonium ion, or alkali metal ion. Examples of the alkali metal ion include sodium ion and potassium ion.

The site to which the ion-conducting group is introduced is not particularly limited and, in view of forming the ion channel easily, the ion-conducting group is preferably introduced to the aryl group (inclusive of the aryl group represented by $R^1$) in the unit (repeating unit represented by formula (I)) derived from the above aromatic vinyl monomer (for example, styrene, α-methylstyrene, p-methylstyrene, vinylnaphthalene, α-methylvinylnaphthalene, and vinylbiphenyl). The ion-conducting group may be introduced by a known method.

The content of the aromatic vinyl compound unit (sum of the units having the ion-conducting group introduced and the units not introduced) in the ion-conducting group-containing block is not particularly limited and, in view of ensuring a sufficient ion conductivity and a good post-emulsifiability, preferably 50 mol % or more (inclusive of 100%) based on the monomer units constituting the block.

Next, the method of using a monomer having the ion-conducting group is described.

The monomer having ion-conducting group is a compound capable of forming a repeating unit represented by formula (I) wherein the ion-conducting group is introduced into the aryl group (Ar), preferably an aromatic vinyl compound having ion-conducting group on the aromatic ring. Specific examples thereof include o-, m- or p-alkylstyrenesulfonic acid, o-, m- or p-α-alkylstyrenesulfonic acid, alkylvinylnaphthalenesulfonic acid, alkylvinylanthracenesulfonic acid, alkylvinylpyrenesulfonic acid, o-, m- or p-alkylstyrenephosphonic acid, o-, m- or p-α-alkylstyrenephosphonic acid, alkylvinylnaphthalenephosphonic acid, alkylvinylanthracenephosphonic acid, and alkylvinylpyrenephosphonic acid.

A conjugated diene having ion-conducting group may be combinedly used as a monomer having ion-conducting group. Specific examples thereof include 1,3-butadiene-1-sulfonic acid, 1,3-butadiene-2-sulfonic acid, isoprene-1-sulfonic acid, isoprene-2-sulfonic acid, 1,3-butadiene-1-phosphonic acid, 1,3-butadiene-2-phosphonic acid, isoprene-1-phosphonic acid, and isoprene-2-phosphonic acid. In addition to the conjugated diene, a vinyl compound, such as vinylsulfonic acid, α-alkylvinylsulfonic acid, vinylalkylsulfonic acid, α-alkylvinylalkylsulfonic acid, vinylphosphonic acid, α-alkylvinylphosphonic acid, vinylalkylphosphonic acid, and α-alkylvinylalkylphosphonic acid, may be combinedly used. A (meth)acrylic monomer having ion-conducting group, such as methacrylic acid, acrylic acid, and 2-acrylamido-2-methyl-1-propanesulfonic acid, is also usable.

The amount of the ion-conducting groups introduced by the monomer having ion-conducting group is the same as in the case where the ion-conducting groups are introduced after the polymerization of the monomer having no ion-conducting group.

In either the case of using the monomer having no ion-conducting group or using the monomer having ion-conducting group, the ion-conducting group may be introduced in the form of salt neutralized by an appropriate metal ion (for example, alkali metal ion) or a counter ion (for example, ammonium ion). Such ion-conducting group is introduced by producing the polymer using sodium o-, m- or p-alkylstyrenesulfonate or sodium o-, m- or p-α-alkylstyrenesulfonate. The sulfonate is easily converted to sulfonic acid by an ion-exchange method.

The block having substantially no ion-conducting group (block for forming the fine rubber particles) is essential to make the electrolyte membrane flexible and elastic. Using flexible and elastic electrolyte membrane, the productivity (assembling ability, bonding ability, and clamping ability) of membrane-electrode assembly (MEA) is improved.

Examples of the repeating units for forming the fine rubber particles include an alkene unit having 2 to 8 carbon atoms, a cycloalkene unit having 5 to 8 carbon atoms, a vinylcycloalkene unit having 7 to 10 carbon atoms, a conjugated diene unit having 4 to 8 carbon atoms, a conjugated cycloalkadiene unit having 5 to 8 carbon atoms, a vinylcycloalkane unit having 7 to 10 carbon atoms, an acrylic ester unit having a side chain having 1 to 12 carbon atoms, and a methacrylic ester unit having a side chain having 1 to 12 carbon atoms. The carbon-carbon double bonds, if any, in the repeating units may be partly or wholly hydrogenated.

The repeating units to be selected from the above group may be used alone or in combination of two or more. Two or more repeating units may be incorporated into a copolymer by any of random copolymerization, block copolymerization, graft copolymerization, and tapered copolymerization. When the monomer to be (co)polymerized includes two carbon-carbon double bonds, any one of the double bonds may participate in polymerization. The conjugated diene may be polymerized via 1,2-bonding, 1,4-bonding, 3,4-bonding, or a combination thereof.

Examples of the monomer which forms the repeating unit capable of forming the fine rubber particles mentioned above include an alkene having 2 to 8 carbon atoms (for example, ethylene, propylene, 1-butene, 2-butene, isobutene, 1-pentene, 2-pentene, 1-hexene, 2-hexene, 1-heptene, 2-heptene, 1-octene, and 2-octene), a cycloalkane having 5 to 8 carbon atoms (for example, cyclopentene, cyclohexene, cycloheptene, and cyclooctene), a vinylcycloalkene having 7 to 10 carbon atoms (for example, vinylcyclopentene, vinylcyclohexene, vinylcycloheptene, and vinylcyclooctene), a conjugated diene having 4 to 8 carbon atoms (for example, 1,3-butadiene, 1,3-pentadiene, isoprene, 1,3-hexadiene, 2,4-hexadiene, 2,3-dimethyl-1,3-butadiene, 2-ethyl-1,3-butadiene, 1,3-heptadiene, and 2,4-heptadiene), a conjugated cycloalkadiene having 5 to 8 carbon atoms (for example, cyclopentadiene and 1,3-cyclohexadiene), an acrylic ester having a side chain having 1 to 12 carbon atoms (for example, methyl acrylate, ethyl acrylate, butyl acrylate, and octyl acrylate), and a methacrylic ester having a side chain having 1 to 12 carbon atoms (for example, methyl methacrylate, ethyl methacrylate, butyl methacrylate, and octyl methacrylate). These monomers may be used alone or in combination of two or more.

In addition to the block having ion-conducting group and the block for forming the fine rubber particles, the block copolymer may further include an optional block as the third block. Example of the optional block includes a non-rubbery block having no ion-conducting group and, in view of enhancing the strength of the electrolyte membrane, preferably an aromatic vinyl-based polymer block having the repeating units mainly derived from an aromatic vinyl compound having no ion-conducting group. If the electrolyte membrane is preferably 20 to 60% by weight, more preferably 23 to 50% by weight, and still more preferably 25 to 40% by weight occupied by the aromatic vinyl-based polymer block, the mechanical strength under use is excellent. The ratio of the aromatic vinyl-based polymer block to the block having ion-conducting group is not particularly limited, and the ratio thereof to the monomer unit before introducing the ion-conducting group is preferably 85:15 to 0:100, and in view of combining the mechanical strength of the electrolyte membrane and high ion conductivity, preferably 65:35 to 20:80, more preferably 55:45 to 35:65, and still more preferably 45:55 to 35:65.

The aromatic vinyl-based polymer block having the repeating units mainly derived from the aromatic vinyl compound having no ion-conducting group is a polymer block including the aromatic vinyl compound unit as a main repeating unit, and enhances the shape stability of the electrolyte membrane. The aromatic vinyl-based polymer block is preferably phase-separated from the rubber fine particles to form a part of the matrix, because the strength of the electrolyte membrane is enhanced. If being phase-separated to form a bicontinuous structure together with the matrix, the aromatic vinyl-based polymer block forms a separate phase to more enhance the shape stability.

The aromatic vinyl-based polymer block is constituted by the repeating units mainly derived from the aromatic vinyl compound having no ion-conducting group. The words "repeating units mainly derived from the aromatic vinyl compound having no ion-conducting group" mean that the aromatic vinyl-based polymer block shows substantially no ion conductivity. For example, the content of the ion-conducting group per one repeating unit of the aromatic vinyl-based polymer block is preferably 0.1 mol or less, more preferably 0.01 mol or less, and still more preferably zero. The molar ratio of the ion-conducting group to the resin component having ion-conducting group in the matrix is preferably $\frac{1}{10}$ or less, more preferably $\frac{1}{20}$ or less, and still more preferably $\frac{1}{100}$ or less (each inclusive of zero). Within the above ranges, the aromatic vinyl-based polymer block shows substantially no ion conductivity and is easily phase-separated from the matrix which forms the ion channel.

The aromatic vinyl-based polymer block is preferably hydrophobic and preferably has substantially no hydrophilic group, such as hydroxyl group and amino group, as well as substantially no polar group, such as ester group. The aromatic vinyl compound unit, which is a main repeating unit of the aromatic vinyl-based polymer block, is formed by the polymerization of the aromatic vinyl compound. The aromatic vinyl compound is a compound which includes at lease one aromatic ring and at least one functional group directly bonding to the carbon atom of the aromatic ring which is inclusive of an addition-polymerizable carbon to carbon double bond. The aromatic ring of the aromatic vinyl compound is preferably carbocyclic aromatic ring, for example, benzene ring, naphthalene ring, anthracene ring, and pyrene ring. The aromatic vinyl compound preferably has 1 to 3 hydrocarbon groups having 1 to 8 carbon atoms on the aromatic ring. Example thereof includes a compound having its hydrogen on the aromatic ring substituted with a substituent, such as vinyl group, 1-alkylethenyl group (for example, isopropenyl group), and 1-arylethenyl group. Specific examples include styrene, 2-methylstyrene, 3-methylstyrene, 4-methylstyrene, 4-ethylstyrene, 4-n-propylstyrene, 4-isopropylstyrene, 4-n-butylstyrene, 4-isobutylstyrene, 4-t-butylstyrene, 4-n-octylstyrene, 2,4-dimethylstyrene, 2,5-dimethylstyrene, 3,5-dimethylstyrene, 2,4,6-trimethylstyrene, 2-methoxystyrene, 3-methoxystyrene, 4-methoxystyrene, vinylnaphthalene, vinylanthracene, and an aromatic vinyl compound having its hydrogen atom on α-carbon atom substituted with an alkyl group having 1 to 4 carbon atoms (for example, methyl group, ethyl group, n-propyl group, isopropyl group, n-butyl group, isobutyl group, sec-butyl group, and tert-butyl group), a haloalkyl group having 1 to 4 carbon atoms (for example, (chloromethyl group, 2-chloroethyl group, and 3-chloroethyl group), or a phenyl group, for example, α-methylstyrene, α-methyl-4-methylstyrene, α-methyl-4-ethylstyrene, α-methyl-4-t-butylstyrene, α-methyl-4-isopropylstyrene, and 1,1-diphenylethylene. These compounds may be used alone or in combination of two or more, with 4-t-butylstyrene, 4-isopropylstyrene, α-methyl-4-t-butylstyrene, and α-methylisopropylstyrene being preferred. The units derived from two or more compounds are introduced into copolymer by any of random copolymerization, block copolymerization, graft copolymerization, and tapered copolymerization.

The aromatic vinyl-based polymer block may include one or more other monomer units as long as the effect of the invention is not adversely affected. Examples of monomers for such other monomer units include a conjugated diene having 4 to 8 carbon atoms (for example, 1,3-butadiene, 1,3-pentadiene, isoprene, 1,3-hexadiene, 2,4-hexadiene, 2,3-dimethyl-1,3-butadiene, 2-ethyl-1,3-butadiene, 1,3-heptadiene, 1,4-heptadiene, and 3,5-heptadiene), an alkene having 2 to 8 carbon atoms (for example, ethylene, propylene, 1-butene, 2-butene, isobutene, 1-pentene, 2-pentene, 1-hexene, 2-hexene, 1-heptene, 2-heptene, 1-octene, and 2-octene), a (meth)acrylic ester (for example, methyl(meth)acrylate, ethyl (meth)acrylate, and butyl(meth)acrylate), a vinyl ester (for example, vinyl acetate, vinyl propionate, vinyl butylate, and vinyl pivalate), and a vinyl ether (for example, methyl vinyl ether and isobutyl vinyl ether). Such monomer for other monomer unit is copolymerized preferably by random copolymerization. The content of the aromatic vinyl-based polymer block is preferably 60% by weight or less, more preferably 50% by weight or less, and still more preferably 40% by weight or less of the block copolymer.

The block copolymer is synthesized by radical polymerization, anion polymerization, cation polymerization, or coordination polymerization according to the kinds of monomers for forming each block and intended molecular weight, with radical polymerization, anion polymerization, and cation polymerization being preferred because of easy application to industrial production. In particular, living polymerization, more specifically, living radical polymerization and living anion polymerization are preferred in view of molecular weight, molecular weight distribution, structure of polymer, and easy bonding between polymer blocks.

The molecular weight of the block copolymer usable in the invention is preferably 10,000 to 2,000,000, more preferably 15,000 to 1,000,000, and still more preferably 20,000 to 500,000 when expressed by a number average molecular weight calibrated by standard polystyrene in view of mechanical properties and processability, although not particularly limited thereto.

The weight ratio of the block having ion-conducting group to the block for forming the fine rubber particles in the block copolymer is selected according to the required properties of the resulting block copolymer and is preferably 95:5 to 55:45 in view of the ion conductivity, 45:55 to 5:95 in view of the water resistance, and 60:40 to 40:60 in view of combining the ion conductivity and water resistance. Within the range of 95:5 to 5:95, the micro phase-separated block (A) having ion-conducting group advantageously forms a cylindrical or continuous ion channel, to exhibit ion conductivity sufficient for practical use. In addition, since the ratio of the hydrophobic block for forming the fine rubber particles is within an appropriate range, excellent water resistance is obtained. The weight ratio mentioned above is calculated based on the polymer blocks assuming that all the ion-conducting groups in the block copolymer are substituted with hydrogen.

For the purpose of enhancing the mechanical strength of the electrolyte membrane and other purpose, the blocks having ion-conducting group may be crosslinked. The molecular chains may be chemically crosslinked, the ion-conducting group is used as the crosslinking site, or both may be combined.

The preparation of the emulsion of the block copolymer will be described. The emulsion may be prepared by a known post-emulsification. The ion-conducting group is hydrophilic and the block for forming the fine rubber particles is hydrophobic. Therefore the block copolymer is capable of forming a protective colloid and can be made into an emulsion without using a surfactant or emulsifier. In addition, the block copolymer easily forms core-shell particles having highly polar ion-conducting groups in their outer shell by using a polar solvent, such as water. The solid content of the emulsion is preferably 1 to 30% by weight.

Any of known emulsification methods are usable, with the phase inversion emulsification being preferred because an emulsion with a narrow particle size distribution is obtained, in which a polar solvent, such as water, is added to a solution of the block copolymer in an appropriate organic solvent under stirring in an emulsifying machine. The organic solvent is selected from a solvent well dissolving the block copolymer (for example, tetrahydrofuran, dimethyl sulfoxide, dimethylformamide, and dimethylacetamide) and a mixed solvent of organic solvents well dissolving each block of the block copolymer. Examples of the organic solvent for the mixed solvent may include an organic solvent well dissolving the block having ion-conducting group, for example, alcohols, with monoalcohols having 3 or more carbon atoms being preferred in view of the affinity with water and the boiling point; an organic solvent well dissolving the block for forming the fine rubber particles, for example, aliphatic hydrocarbon solvents and aromatic hydrocarbon solvents, with aromatic hydrocarbon solvents (for example, toluene and xylene) being preferred in view of the affinity with the organic solvent well dissolving the block having ion-conducting group. In the initial stage of the emulsification, particles of the polar solvent, such as water, are dispersed in the organic solvent phase. When the addition amount of the polar solvent exceeds a certain level, the system changes to a bicontinuous state, and the viscosity increases sharply. By further adding the polar solvent, the polar solvent forms the continuous phase and the organic solvent containing the block copolymer forms the discontinuous phase (fine particles), and the viscosity decreases sharply. By this method, an emulsion of particles with uniform size is obtained.

If the particle size of core-shell particles is as large as exceeding 1 μm, the block copolymer is phase-separated inside the particles, failing to localize the entire ion-conducting groups in the outer shell and utilize the ion-conducting groups effectively. Therefore, the particles are preferably atomized so as to have an average particle size of 1 μm or less, although depending upon the molecular weight of the block copolymer and the ratio between the blocks. In the emulsification mentioned above, since the average particle size obtained is 1 μm or more in many cases, it is recommended to further micro-disperse the particles. The micro dispersion can be obtained by a known method, but a method using a grinding medium, such as balls used in ball mill, should be avoided in view of preventing the contamination by impurities. Specific example thereof includes a high-pressure impact method.

The fine rubber particles for use in the electrolyte membrane of the invention may be crosslinked. The crosslinking may be conducted during or after forming the fine particles as will be described below with respect to the soap-free emulsion polymerization. The method of crosslinking is not particularly limited and a method generally used is usable.

(2) Preparation of Dispersion by Soap-Free Emulsion Polymerization

Since the dispersion prepared by a usual emulsion polymerization using an emulsifier allows the emulsifier to remain in the obtained membrane in many cases to adversely affect the cell performance and durability, a soap-free emulsion polymerization is preferably used in the invention. In the soap-free emulsion polymerization, a monomer having ion-conducting group (inclusive of salt form), a monomer for forming the rubber component, and an optional crosslinking monomer are polymerized in a polar solvent, such as water. As mentioned with respect to the post-emulsification of the block copolymer, by the polymerization in a polar solvent, the ion-conducting groups (inclusive of salt form) are effectively localized in the outer shell of the fine core-shell particles. Since the ion-conducting groups (inclusive of salt form) merely cover the surface of the fine core-shell particles, a particle size as small as possible, for example, 100 nm or less is preferred. The ion-conducting group in the form of salt needs to be converted to the acid form by ion-exchanging. The conversion may be conducted in the state of emulsion or after making the membrane.

To emulsify the polymerization product liquid of the soap-free emulsion polymerization, the monomer having ion-conducting group (inclusive of salt form) is preferably surface-active. More preferred is a monomer having both a hydrophilic portion and a hydrophobic portion. Since the hydrophilic portion forms the ion-conducting phase, it needs to be a group having sufficient ion conductivity, for example, it is preferably a sulfonic acid group, a phosphoric acid group or a salt form thereof. To allow the polymerization to proceed in micelle, the polymerizable group must be present in the hydrophobic portion. The polymeriziable group is a group which is radically polymerizable and copolymerizable with other components, and examples thereof include acryloyl group, methacryloyl group, vinyl group, and allyl group. The linker between the hydrophilic portion and the polymerizable group preferably include 3 or more carbon atoms and oxygen atoms in total. Examples of the linker include an alkyl group having 3 or more carbon atoms and a polyoxyalkylene group having 2 or more carbon atoms and one or more oxygen atoms.

Examples of the monomer (monomer for forming the resin component having ion-conducting groups) meeting the above requirements include acryloyloxyalkylene sulfuric acid ester and its alkali metal salt, acryloyloxypolyoxyalkylene sulfuric acid ester and its alkali metal salt, methacryloyloxyalkylene sulfuric acid ester and its alkali metal salt, methacryloyloxy-polyoxyalkylene sulfuric acid ester and its alkali metal salt, alkylallylalkylene sulfuric acid ester and its alkali metal salt, alkylallylpolyoxyalkylene sulfuric acid ester and its alkali metal salt, acryloylbis(polyoxyalkylene polycyclic phenyl ether) sulfonic acid ester and its alkali metal salt, methacry-loylbis(polyoxyalkylene polycyclic phenyl ether) sulfonic acid ester and its alkali metal salt, acryloyloxyalkylene phosphoric acid ester, acryloyloxypolyoxyalkylene phosphoric acid ester, methacryloyloxyalkylene phosphoric acid ester, methacryloyloxypolyoxyalkylene phosphoric acid ester, alkylallylalkylene phosphoric acid ester, and alkylallylpoly-oxyalkylene phosphoric acid ester. These monomers may be used in combination of two or more, if necessary.

Of the above monomers, particularly preferred are acrylic esters and methacrylic esters each having the ion-conducting group in the ester moiety.

The monomer for forming the rubber component (fine rubber particles) is a compound which is radically polymerizable and gives a polymer having a glass transition temperature of 10° C. or lower. Examples thereof include an acrylic ester, such as methyl acrylate, ethyl acrylate, butyl acrylate, octyl acrylate, and dodecyl acrylate; a methacrylic ester, such as methyl methacrylate, ethyl methacrylate, butyl methacrylate, octyl methacrylate, and dodecyl methacrylate; and a vinyl ester, such as vinyl acetate, vinyl butylate, and vinyl pivalate.

The fine rubber particles may be crosslinked. Compounds having two or more polymerizable groups are usable as the crosslinking agent. Examples of the crosslinking agent include an acrylate, such as ethylene glycol diacrylate, hexanediol diacrylate, nonanediol diacrylate, polyoxymethylene diacrylate, diacrylate of polyoxyalkyl-modified bisphenol A, dicyclopentadiene diacrylate, trimethylolpropane triacrylate, triacrylate of polyoxyalkylene-modified trimethylolpropane, pentaerythritol triacrylate, pentaerythritol tetraacrylate, dipentaerythritol tetraacrylate, dipentaerythritol hexaacrylate, and di- or triacrylate of polyoxyalkylene-modified isocyanurate; a methacrylate, such as ethylene glycol dimethacrylate, hexanediol dimethacrylate, nonanediol dimethacrylate, polyoxymethylene dimethacrylate, dimethacrylate of polyoxyalkyl-modified bisphenol A, dicyclopentadiene dimethacrylate, trimethylolpropane trimethacrylate, trimethacrylate of polyoxyalkylene-modified trimethylolpropane, pentaerythritol trimethacrylate, pentaerythritol tetramethacrylate, dipentaerythritol tetramethacrylate, dipentaerythritol hexamethacrylate, and di- or trimethacrylate of polyoxyalkylene-modified isocyanurate; and other compounds, such as allyl acrylate, allyl methacrylate, and divinylbenzene. These compounds may be used in combination of two or more, if necessary.

The emulsion polymerization is conducted by a known method. A radical generator, such as potassium persulfate, and a redox initiator may be used as the initiator. An inorganic salt, such as sodium carbonate, may be used to enhance the dispersion stability. However, the use of an emulsifier is not recommended. The solid content of the emulsion obtained by the emulsion polymerization is preferably 1 to 30% by weight and more preferably 2 to 20% by weight in view of the balance between the stability of the emulsion and its productivity.

(3) Formation of Membrane

The dispersion (emulsion) of fine core-shell particles obtained by the post-emulsification of block copolymer or the emulsion polymerization is then coated on a base film (for example, PET film). The coating amount is regulated so as to obtain the final electrolyte membrane having a thickness of several micrometers to several tens of micrometers. The coating head is selected according to the viscosity of dispersion and the desired thickness. A usual coating method, such as comma coater, gravure coater, die coater, kiss reverse coater, and spray coater, is employed for forming continuous membrane. A method, such as bar coater, block coater, applicator, spray, and die coater, is used for forming individual membrane.

The dispersion may be included with an additive, such as inorganic or organic particles, leveling agent, crosslinking agent, crosslinking aid, and initiator, if necessary. However, the use of an emulsifier is not recommended. The additive may be included in the resin component having the ion-conducting group, the fine rubber particles, the dispersion medium, or two or more of these phases.

Then, the coated dispersion is dried for solidification. To reduce the drying time, high temperatures are preferred. However, high drying temperatures exceeding the glass transition temperature of the resin destroy the core-shell structure if the resin is not crosslinked. Even when crosslinked, the drying temperature is preferably 60 to 100° C. in view of avoiding the degradation or decomposition of the resin. By peeling off the membrane obtained by drying and solidification from the base film, the electrolyte membrane of the invention is obtained. If an emulsifier remains in the electrolyte membrane, the degradation or elution of the emulsifier occurs during its use, thereby degrading the electrolyte membrane. Therefore, it is preferred for the electrolyte membrane to be substantially free from an emulsifier (the content is 1% by weight or less). The emulsifier which should be avoided is that having a molecular weight of 2000 or less, particularly, a molecular weight of 1000 or less.

Figure 2:
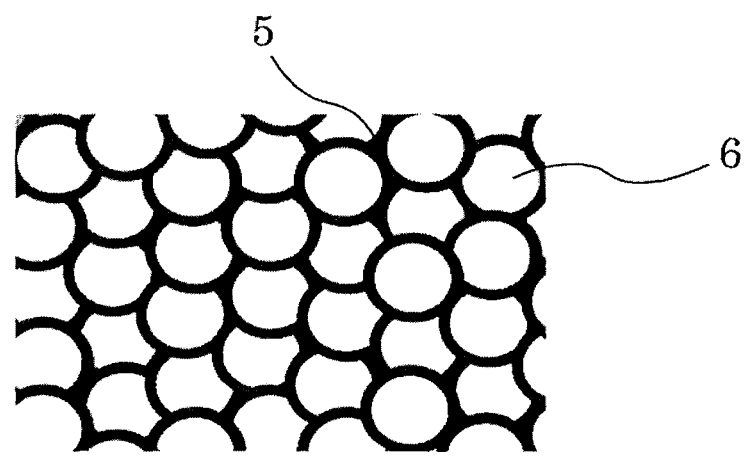
FIG. 2 is a schematic illustration showing an electrolyte membrane obtained by drying and solidifying the dispersion of FIG. 1.

The dispersion (emulsion) of the fine core-shell particles and the electrolyte membrane obtained from the dispersion by drying for solidification are schematically shown in FIG. 1 and FIG. 2, respectively.

As shown in FIG. 1, in the dispersion, fine core-shell particles 1 are dispersed in a dispersion medium 4 (polar solvent, such as water). When the dispersion is prepared by the post-emulsification of the block polymer, the resin component having ion-conducting groups (ion-conducting group-containing block) forms the shell 2 of the fine core-shell particles 1, and the rubber component (fine particle-forming block) forms the core 3 of the fine core-shell particles 1. When the dispersion is prepared by the emulsion polymerization, the portion formed by the polymerization of the monomers having ion-conducting group forms the shell 2, and the portion formed by the polymerization of the rubber component-forming monomers forms core 3.

As shown in FIG. 2, in the electrolyte membrane obtained by drying the dispersion for solidification, the shell 5 (resin component having ion-conducting groups) of the fine core-shell particles 1 forms the continuous matrix, and the core 6 forms the fine rubber particles which are separately dispersed throughout the matrix.

The shape of the fine rubber particles may be sphere inclusive of non-true sphere having an elliptical or polygonal cross section. The ratio of the longest dimension (major axis of ellipse) and the shortest dimension (minor axis of ellipse) is preferably less than 2. The glass transition temperature or softening point of the component for forming the fine rubber particles is preferably 10° C. or lower.

The average particle size of the fine rubber particles is 20 nm to 1 µm. The effect intended in the invention may be basically obtained even when the particle size are large, as long as the fine rubber particles are separately dispersed. However, in view of obtaining a flat membrane, it is desirable that at least the average particle size is sufficiently smaller than the thickness of the electrolyte membrane. Since the thickness of the electrolyte membrane is generally from several micrometers to several tens of micrometers, the average particle size of the fine rubber particles is required to be substantially 1 µm or less. Fine particles having an average particle size of less than 20 nm is difficult to stably produce in some cases. The average particle size is preferably 30 to 800 nm and more preferably 40 to 500 nm.

The average particle size of the fine rubber particles in the dispersion before formed into membrane is determined by a usual light scattering method. After forming into membrane, the average particle size is determined by averaging the sizes of all fine rubber particles in a square with sides of 0.5 to 5 µm on a transmission electron microphotograph of a cross section of the membrane, while omitting the particles which are cut by the side of square. The size of non-spherical particle is expressed by a geometric mean of the longest dimension and the shortest dimension.

The electrolyte membrane of the invention may be laminated with another layer to form a laminated electrolyte membrane, if necessary. The electrolyte membrane of the invention may be disposed outside or inside a three or more layered laminate electrolyte membrane. In addition, two or more electrolyte membranes of the invention may be disposed inside a laminated electrolyte membrane.

(4) Membrane-Electrode Assembly (MEA)

The electrolyte membrane of the invention is applicable to the production of MEA. MEA is structured from an electrolyte membrane and electrodes formed on both sides thereof. Since each electrode is composed of a catalyst layer and a gas diffusion layer (GDL), MEA is actually a laminate with 5 or more layers. MEA is produced by a method in which a catalyst ink is applied to an electrolyte membrane and then GDL is bonded thereto, a method in which a catalyst layer formed on a base film is bonded to an electrolyte membrane and then GDL is bonded thereto, or a method in which a catalyst layer is formed on GDL and then it is bonded to an electrolyte membrane.

The catalyst layer has functions of diffusing the fuel rapidly to effectively cause electrochemical decomposition, allowing electrons generated by the decomposition to easily move to outer circuits, and allowing ions generated by the decomposition to easily move to the electrolyte membrane.

The catalyst is necessary to electrochemically decompose the fuel. Catalysts hitherto known are usable. Examples thereof include noble metals, such as platinum and platinum-ruthenium alloy, and complex electrode catalysts. When a carbon-containing compound, such as methanol, is used as the fuel, the catalyst is deactivated by carbon dioxide generated at anode. In such case, therefore, the use of a catalyst resistant to the deactivation, such as platinum-ruthenium alloy, is particularly preferred.

A highly electroconductive material is preferably used to transport the electrons which are generated by the electrochemical decomposition on the catalyst. Examples thereof include an electroconductive carbon material, such as carbon black and carbon nanotube, a ceramic material, such as titanium oxide. A structure wherein the catalyst is supported on the surface of the above material is preferably used for effectively transporting the electrons generated by the decomposition on the catalyst.

An electrolytic binder is used as the medium for transporting ions. The material for the binder may be the same as or similar to those for the electrolyte membrane of the invention. A material quite different from those is also usable. Since the anode and the cathode are required to have different functions, only one of them may be made of a material which is the same as that for the electrolyte membrane of the invention. In addition to the material for the electrolyte of the invention, a fluorine-containing electrolyte is also usable as the material for binder.

The catalyst ink is prepared by mixing the components mentioned above by a known mixing method, such as ball mill, bead mill, homogenizer, paint shaker, and ultrasonic irradiation. To enhance the micro dispersibility, a micro dispersing method, such as high pressure impact method, may be combinedly used.

The catalyst ink thus prepared is made into a catalyst layer by a usual membrane-forming method or printing method, for example, spray, screen printing, gravure printing, intermittent die coating, and inkjet printing.

The catalyst layer is formed by a known method, for example, a method of directly forming on the electrolyte membrane, a method of forming on the gas diffusing layer, or a method of transferring the catalyst layer formed on a base film.

Fuel cells using hydrogen or methanol as the fuel are produced by assembling MEA thus produced into cell.

EXAMPLES

The present invention will be described in more detail with reference to the examples. However, it should be noted that the scope of the invention is not limited thereto.

(1) Measurement of Ion Exchange Capacity (Meq/G)

An amount (a g) of sample was placed in a hermetically sealable glass container and then a small amount of a saturated aqueous solution of sodium chloride was added. After stirring for 12 h, the amount of hydrogen chloride generated in the system was determined by titration with a 0.01 N NaOH standard solution (factor: f, consumed amount: b ml) using a phenolphthalein indicator.

The ion exchange capacity was calculated from the following equation:

$$\text{ion exchange capacity} = (0.01 \times b \times f)/a.$$

(2) Evaluation of Cell Performance

A cell for a polymer electrolyte fuel cell was produced as follows. Carbon supporting Pt catalyst and a 5% by weight methanol solution of Nafion (trademark of E.I. du Pont de Nemours & Co., Inc) was mixed in a weight ratio of 1:1 (Pt:Nafion) to prepare a uniformly dispersed paste. The paste was applied on a transfer sheet and dried for 24 h to prepare a catalyst sheet. An electrolyte membrane separately produced was sandwiched between two catalyst sheets with two catalyst surfaces facing each other. On both outermost sides, two heat-resistant films and two stainless plates were stacked in this order. Then, the electrolyte membrane and the catalyst sheet were bonded to each other by hot press (130° C., 1.5 MPa, 8 min). Finally, the stainless plates, heat-resistant films and transfer sheets were removed, to obtain a membrane-electrode assembly. Then, the obtained membrane-electrode assembly was sandwiched between two carbon papers and further sandwiched between two conductive separators also serving as gas supply path, two current collectors, and two fastening plates, to produce a cell for evaluating the performance of a polymer electrolyte fuel cell.

The power generation characteristics were evaluated at cell temperature of 70° C. by supplying humidified hydrogen to the anode and humidified air to the cathode. The power generation characteristics were evaluated by the cell resistivity ($\mu\Omega \cdot cm^2$) measured at a current density of 1 A/cm² under 100% RH or 30% RH while setting the hydrogen utilization to 67% and the air utilization to 50%.

(3) Fine Structure Observation

After embedding an electrolyte membrane in an epoxy resin, extremely thin slice having a thickness of about 90 nm was cut using a cryoultramicrotome. The extremely thin slice was stained with RuO4 vapor and its fine structure was observed under a transmission electron microscope (TEM) at an accelerating voltage of 100 kV.

Transmission electron microscope: H7100FA manufactured by Hitachi High-Technologies Corporation.

(4) Measurement of Particle Size of Fine Rubber Particles in Electrolyte Membrane Each of the whole fine rubber particles in a square with sides of 1 µm observed under a transition electron microscope were measured for its longest dimension and shortest dimension. The geometric mean thereof was taken as the particle size of each fine rubber particle. The measured particle sizes were averaged to obtain the average particle size. In Comparative Example 1, the observed field was changed to a square with sides of 50 µm.

Synthesis Example 1

Synthesis of Block Copolymer

In accordance with the method described in Patent Document 4, a poly($\alpha$-methylstyrene)-b-polybutadiene-b-poly($\alpha$-methylstyrene) type triblock copolymer (mSEBmS) was synthesized. The number average molecular weight of mSEBmS was 76,000 when measure by GPC using standard polystyrene calibration. The content of 1,4-bonding in the polybutadiene block was 55 mol % and the content of the $\alpha$-methylstyrene unit was 30.0% by weight when determined by $^1$H-NMR spectrometry. The component analysis by $^1$H-NMR spectrometry showed that substantially no $\alpha$-methylstyrene was copolymerized in the polybutadiene block.

The synthesized mSEBmS was dissolved in cyclohexane. The obtained solution was fully replaced with nitrogen and then charged into a pressure container, where mSEBmS was hydrogenated under hydrogen atmosphere at 80° C. for 5 h in the presence of a Ni/Al-containing Ziegler hydrogenation catalyst, to obtain a poly($\alpha$-methylstyrene)-b-hydrogenated polybutadiene-b-poly($\alpha$-methylstyrene) type triblock copolymer (block copolymer). The degree of hydrogenation of the block copolymer was 99.6% when determined by $^1$H-NMR spectrometry.

Synthesis Example 2

Synthesis of Polymer Electrolyte

In a glass reaction vessel equipped with a stirring device, 100 g of the block copolymer obtained in Synthesis Example 1 was vacuum-dried for one hour. Then, after purging with nitrogen, 1000 ml of methylene chloride was added and the block copolymer was dissolved therein by stirring at 35° C. for 2 h. After dissolution, a sulfating agent prepared by reacting 21.0 ml of acetic anhydride and 9.34 ml of sulfuric acid in 41.8 ml of methylene chloride at 0° C. was gradually added dropwise over 20 min. After stirring at 35° C. for 0.5 h, the polymer solution was poured into 2 L of distilled water under stirring, to coagulate and precipitate the polymer. The precipitated solid matter was washed with water at 90° C. for 30 min and then filtered. The washing-filtration cycles were repeated until the pH of washings no longer changed. Finally, the polymer collected by filtration was vacuum-dried to obtain polymer electrolyte A (block copolymer having ion-conducting groups). The results of $^1$H-NMR spectrometry of the obtained polymer electrolyte A showed that the degree of sulfonation of benzene rings in the $\alpha$-methylstyrene units was 20.6 mol % and the ion exchange capacity was 0.48 meq/g.

Synthesis Example 3

Synthesis of Polymer Electrolyte B

In the same manner as in Synthesis Example 2 except for stirring for 8 h after adding the sulfating agent dropwise, polymer electrolyte B (block copolymer having ion-conducting groups) was obtained. The results of $^1$H-NMR spectrometry of the obtained polymer electrolyte B showed that the degree of sulfonation of benzene rings in the $\alpha$-methylstyrene units was 51.0 mol % and the ion exchange capacity was 1.12 meq/g.

Production Example 1

Production of Emulsion A

In 80 g of a mixed solvent of toluene/isopropanol=80/20, 20 g of polymer electrolyte A obtained in Synthesis Example 2 was dissolved to prepare a 20% by weight polymer solution. In an emulsifying machine, the polymer solution was subjected to phase inversion emulsification by gradually adding 150 g of water under stirring over about 20 min. The average particle size of the particles dispersed in the obtained emulsion was 7 µm when measured by static light scattering method. Then, the mixed solvent was removed from the emulsion by using an evaporator. The obtained emulsion was made into a micro dispersion by a high-pressure impact method (nanomizer, 150 MPa) to obtain an emulsion containing the fine core-shell particles having an average particle size of 150 nm. The emulsion was concentrated by using an evaporator to obtain emulsion A having a solid content of 15% by weight.

Production Example 2

Production of Emulsion B

In the same manner as in Production Example 1 except for using polymer electrolyte B obtained in Synthesis Example 3, emulsion B was obtained. The average particle size of the fine core-shell particles was 90 nm and the solid content was 17.2% by weight.

Production Example 3

Production of Emulsion c

In a glass reaction vessel equipped with a condenser and a stirring device, 495 g of water, 52 g of methacryloyloxypoly-oxyalkylene sulfuric acid ester sodium salt (Eleminol RS-30 manufactured by Sanyo Chemical Industries, Ltd.), and 1.4 g of hexanediol dimethacrylate were charged and stirred. After purging with nitrogen at room temperature for 30 min, 50 mg of potassium persulfate (KPS) dissolved in 5 g of water was added and the temperature was raised to 60° C. The emulsion polymerization was allowed to proceed for 5 h and then the resulting emulsion was concentrated by an evaporator to obtain emulsion C. The average particle size was 150 nm when measure by static light scattering method. The solid content was 12.0% by weight.

Production Example 4

Production of Emulsion D

In 80 g of a mixed solvent of toluene/isopropanol=80/20, 20 g of polymer electrolyte A obtained in Synthesis Example was dissolved to prepare a 20% by weight polymer solution. In an emulsifying machine, the polymer solution was subjected to phase inversion emulsification by gradually adding 150 g of water under stirring over about 20 min. The average particle size of the particles dispersed in the obtained emulsion was 7 μm when measured by static light scattering method. Then, the mixed solvent was removed from the emulsion by using an evaporator, to obtain emulsion D having a solid content of 13.2% by weight.

Examples 1 to 3

Production of Electrolyte Membranes A to C

Each of emulsions obtained in Production Examples 1 to 3 was coated on a release liner-processed PET film (Ester Film K1504 manufactured by Toyobo Co., Ltd.) and dried at 60° C. for 10 min, to obtain each of electrolyte membranes A to C. The membrane thickness of each of the obtained electrolyte membranes is shown in Table 1. The power generation characteristics of each thereof are shown in Table 2. A transmission electron microphotograph showing the structure of electrolyte membrane A is shown in FIG. 1. The average particle size of the fine rubber particles determined by transmission electron microscope is shown in Table 1.

Comparative Example 1

Production of Electrolyte Membrane D

In the same manner as in Example 1 except for using emulsion D, electrolyte membrane D was obtained. The membrane thickness of electrolyte membrane D is shown in Table 1. The power generation characteristics thereof are shown in Table 2. The average particle size of the fine rubber particles determined by transmission electron microscope is shown in Table 1.

Comparative Example 2

Production of Electrolyte Membrane E

Figure 4:
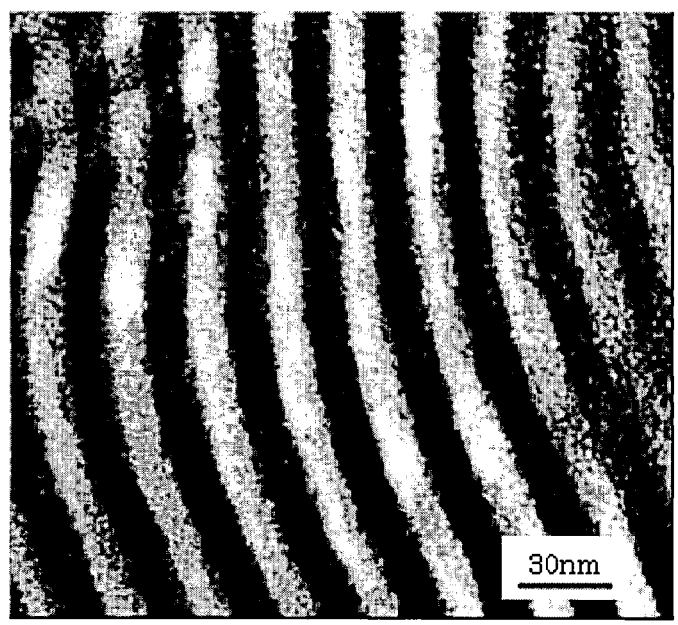
FIG. 4 is a transmission electron microphotograph showing the structure of the electrolyte membrane E of Example 2.

In 80 g of a mixed solvent of toluene/isopropanol=80/20, 20 g of polymer electrolyte A obtained in Synthesis Example 2 was dissolved to prepare a 20% by weight polymer solution. The obtained polymerization solution was coated on a release liner-processed PET film (Ester Film K1504 manufactured by Toyobo Co., Ltd.) without emulsification and dried at 60° C. for 10 min, to obtain electrolyte membrane E. The membrane thickness of the obtained electrolyte membrane is shown in Table 1. The power generation characteristics thereof are shown in Table 2. A transmission electron microphotograph showing the structure of electrolyte membrane E is shown in FIG. 4, wherein a white portion is a rubber component and a black portion is a resin component having ion-conducting groups.

TABLE 1

| | Polymer electrolyte | Emulsion | Electrolyte membrane | Average particle size (μm) | Thickness (μm) |
|---|---|---|---|---|---|
| Examples | | | | | |
| 1 | polymer electrolyte A | emulsion A | electrolyte membrane A | 0.12 | 33 |
| 2 | polymer electrolyte B | emulsion B | electrolyte membrane B | 0.07 | 35 |
| 3 | — | emulsion C | electrolyte membrane C | 0.12 | 35 |
| Comparative Examples | | | | | |
| 1 | polymer electrolyte A | emulsion D | electrolyte membrane D | 5.92 | 30 |
| 2 | polymer electrolyte A | — | electrolyte membrane E | — | 28 |

TABLE 2

| | Cell resistance (mΩ · cm$^2$) at 1 A/cm$^2$ current density | |
|---|---|---|
| | under 100% RH | under 30% RH |
| Examples | | |
| 1 | 78 | 105 |
| 2 | 101 | 142 |
| 3 | 88 | 121 |
| Comparative Examples | | |
| 1 | 388 | Unmeasurable (>25,000) |
| 2 | 338 | Unmeasurable (>25,000) |

Figure 3:
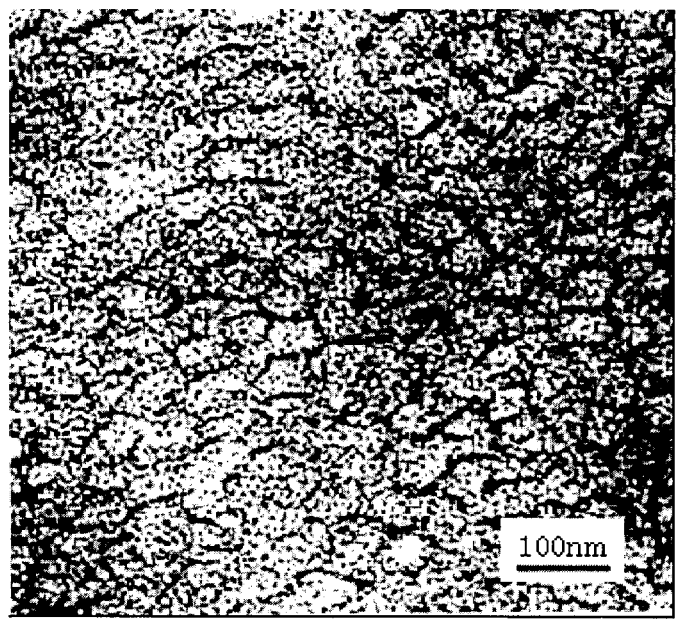
FIG. 3 is a transmission electron microphotograph showing the structure of the electrolyte membrane A of Example 1.

From Table 1, FIG. 3 and FIG. 4 (Example 1 and Comparative Example 2), it is appear that the increase in the resistance at low humidity condition is drastically prevented by the structure of the invention even when the materials used are the same. I addition, the average particle size of the fine rubber particles of Comparative Example 1 is extremely large and it is appear that the membrane thereof fails to have the membrane structure specified in the invention. Therefore, the electrolyte membrane of Comparative Example 1 fails to exhibit the effect obtained in the invention. From the above results, it is appear that a fuel cell showing high power generation characteristics is obtained by using the electrolyte membrane having the structure specified in the invention.

REFERENCE NUMERALS

1: Fine core-shell particles
2, 5: Shell
3, 6: Core
4: Dispersion medium

What is claimed is:

1. An electrolyte membrane, comprising:
a structure comprising an aggregate of at least one fine core-shell particle,
wherein a core of the core-shell particle comprises, as a core, at least one fine rubber particle with an average particle size of 20 nm to 1 μm and with a content of less than 5 mol % of monomer units comprising ion-conducting groups,
wherein the fine rubber particle is uniformly dispersed in a matrix comprising a resin component,
wherein a repeating unit of the resin component comprises at least one ion-conducting group,
wherein an outer surface of the at least one fine rubber particle is covered, as a shell, with the resin component,
wherein the ion-conducting group in the resin component is a proton-conducting group, and
wherein the ion-conducting group in the resin component is at least one group selected from the group consisting of a sulfonic acid group, a phosphonic acid group, a carboxyl group, and any salt form thereof, of formulae —SO$_3$M, —PO$_3$HM, or —COOM wherein M is hydrogen ion, ammonium ion, or alkali metal ion.

2. The electrolyte membrane of claim 1, wherein the structure further comprises a block copolymer comprising:
at least one first block comprising a resin component with ion-conducting groups; and
at least one second block comprising a component forming the at least one fine rubber particle.

3. The electrolyte membrane of claim 1, wherein the resin component with the at least one ion-conducting group comprises at least one repeating unit represented by formula (I):

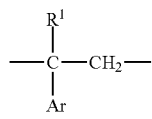

(I)

wherein:
Ar is an aryl group with 6 to 14 carbon atoms and optionally with 1 to 3 substituents;
R$^1$ is a hydrogen atom, an alkyl group with 1 to 4 carbon atoms and optionally with 1 to 9 substituents, or an aryl group with 6 to 14 carbon atoms and optionally with 1 to 3 substituents; and
a part or whole of at least one aryl group in the at least one repeating unit has the ion-conducting group.

4. The electrolyte membrane of claim 1, wherein the at least one fine rubber particle comprises:
a polymer comprising at least one repeating unit selected from the group consisting of:
an alkene unit with 2 to 8 carbon atoms;
a cycloalkene unit with 5 to 8 carbon atoms;
a vinylcycloalkene unit with 7 to 10 carbon atoms;
a conjugated diene unit with 4 to 8 carbon atoms;
a conjugated cycloalkadiene unit with 5 to 8 carbon atoms;
a vinylcycloalkane unit with 7 to 10 carbon atoms;
an acrylic ester unit with a side chain having 1 to 12 carbon atoms; and
a methacrylic ester unit with a side chain having 1 to 12 carbon atoms; or
a polymer obtained by hydrogenating a part or whole of carbon-carbon double bonds of a first polymer.

5. The electrolyte membrane of claim 1, wherein the resin component comprises a polymer comprising repeating units obtained from an acrylic ester or a methacrylic ester each with the at least one ion-conducting group.

6. The electrolyte membrane of claim 1, wherein the at least one fine rubber particle comprises a polymer comprising repeating units obtained from an acrylic ester, a methacrylic ester, or a vinyl ester.

7. The electrolyte membrane of claim 1, wherein an emulsifier content of the electrolyte membrane is 1% by weight or less.

8. A multi-layered electrolyte membrane, comprising a multi-layered structure comprising at least one layer of the electrolyte membrane of claim 1, wherein the at least one layer of the electrolyte membrane is disposed on a surface of, or an inside of, the multi-layered structure.

9. A membrane-electrode assembly, comprising at least one electrode on both surfaces of the electrolyte membrane of claim 1.

10. A method of producing an electrolyte membrane, the method comprising:
(1) dispersing at least one fine core-shell particle comprising at least one fine rubber particle covered with a resin component, wherein the at least one fine rubber particle has a content of less than 5 mol % of monomer units comprising ion-conducting group and the resin component comprises at least one ion-conducting group, thereby obtaining a dispersion; and
(2) solidifying the dispersion by drying, thereby obtaining a structure wherein the at least one fine particle has an average particle size of 20 nm to 1 μm and is uniformly dispersed in a matrix comprising the resin component.

11. The method of claim 10, wherein an emulsifier content of the dispersion is 1% by weight or less.

12. A membrane-electrode assembly, comprising at least one electrode on both surfaces of the multi-layered electrolyte membrane of claim 8.

13. The electrolyte membrane of claim 1, wherein the fine rubber particle is covalently bonded to the resin component.

14. The electrolyte membrane of claim 1, wherein a cell resistance at 1 A/cm$^2$ current density under 30% RH of the electrolyte membrane is 142 mΩ·cm$^2$ or less.

* * * * *